(12) United States Patent
Katsuda

(10) Patent No.: US 8,384,808 B2
(45) Date of Patent: Feb. 26, 2013

(54) IMAGING APPARATUS

(75) Inventor: Yasutoshi Katsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 121 days.

(21) Appl. No.: 12/972,973

(22) Filed: Dec. 20, 2010

(65) Prior Publication Data

US 2011/0164157 A1      Jul. 7, 2011

(30) Foreign Application Priority Data

Dec. 28, 2009   (JP) .............................. P2009-298397

(51) Int. Cl.
*H04N 5/335*    (2011.01)
*H04N 5/225*    (2006.01)

(52) U.S. Cl. ........................ 348/280; 348/335

(58) Field of Classification Search ............... 348/342, 348/350, 280, 335
See application file for complete search history.

(56) References Cited

U.S. PATENT DOCUMENTS

2006/0203100 A1*   9/2006   Ajito et al. .................. 348/220.1
2007/0188650 A1*   8/2007   Kobayashi et al. ........... 348/344

FOREIGN PATENT DOCUMENTS

JP         2008-052246         3/2008

* cited by examiner

*Primary Examiner* — Aung S Moe
(74) *Attorney, Agent, or Firm* — Wolf, Greenfield & Sacks, P.C.

(57) ABSTRACT

An imaging apparatus includes a half mirror that splits light from a subject having passed through a photographic optical system into transmitted light and reflected light, a first light receiving sensor that receives the transmitted light, the first light receiving sensor having a spectral sensitivity characteristic with a sensitivity peak at a specific wavelength of light, and a second light receiving sensor that receives the reflected light. The wavelength of a transmission peak in the spectral transmission characteristic of the half mirror matches the wavelength of the sensitivity peak of the first light receiving sensor.

5 Claims, 10 Drawing Sheets

IMAGING APPARATUS

BACKGROUND OF THE INVENTION

1. Field of the Invention

The present invention relates to an imaging apparatus including a half mirror that splits light from a subject having passed through a photographic optical system into transmitted light and reflected light.

2. Description of the Related Art

Among imaging apparatuses such as digital still cameras, there has been proposed an imaging apparatus which has a half mirror (semi-transparent mirror) provided on the optical path of light from a subject having passed through a taking lens, so that light transmitted through the half mirror is made incident on an imaging device to enable acquisition of an image of the subject, and reflected light is made incident on a range sensor (AF sensor) or a metering sensor (AE sensor) to enable focus detection or the like for the subject (see, for example, Japanese Unexamined Patent Application Publication No. 2008-52246).

Such a half mirror is so designed/fabricated that the ratio between the amounts of transmitted light and reflected light is substantially constant (for example, 7:3) irrespective of the wavelength of light.

SUMMARY OF THE INVENTION

However, according to the above-described half mirror, the ratio between the amounts of transmitted light and reflected light is constant irrespective of the wavelength of light, and thus the range sensor or the like that receives reflected light can receive only about 30% of the amount of subject light having passed through the taking lens. This often results in situations where the amount of reflected light is deficient for a dark subject, making fast focus detection difficult.

It is desirable to provide an imaging apparatus that can reduce a deficiency in the amount of reflected light at a half mirror that splits light from a subject into transmitted light and reflected light.

According to an embodiment of the present invention, there is provided an imaging apparatus including a half mirror that splits light from a subject having passed through a photographic optical system into transmitted light and reflected light, a first light receiving sensor that receives the transmitted light, the first light receiving sensor having a spectral sensitivity characteristic with a sensitivity peak at a specific wavelength of light, and a second light receiving sensor that receives the reflected light, in which a wavelength of a transmission peak in a spectral transmission characteristic of the half mirror matches the wavelength of the sensitivity peak of the first light receiving sensor.

According to an embodiment of the present invention, the wavelength of a transmission peak in the spectral transmission characteristic of a half mirror, which splits light from a subject having passed through a photographic optical system into transmitted light and reflected light, matches the wavelength of a sensitivity peak in the spectral sensitivity characteristic of a first light receiving sensor that receives the transmitted light. As a result, a deficiency in the amount of light reflected at the half mirror can be reduced.

DESCRIPTION OF THE PREFERRED EMBODIMENTS

First Embodiment

[Configuration of Main Part of Imaging Apparatus]

Figure 1:
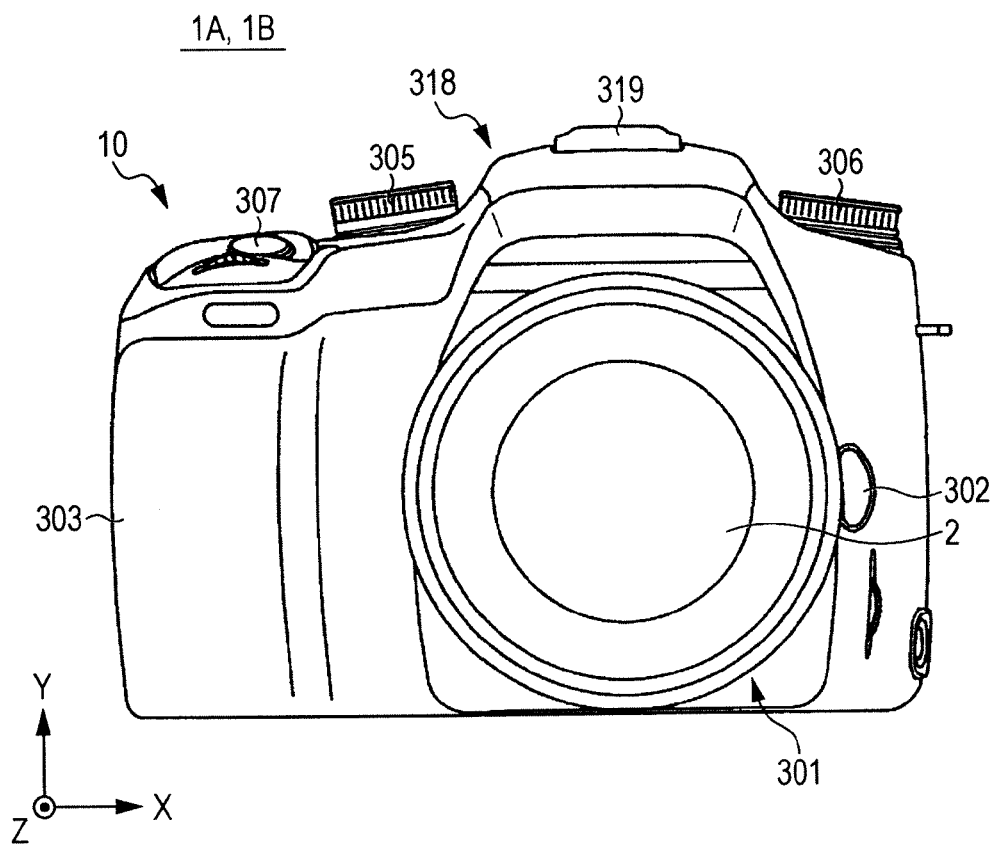
FIG. 1 is a front view showing the exterior configuration of an imaging apparatus according to a first embodiment of the present invention.

FIG. 1 is a front view showing the exterior configuration of an imaging apparatus 1A according to a first embodiment of the present invention.

The imaging apparatus 1A is configured as a digital still camera, and includes a camera body 10A, and an interchangeable lens 2 serving as a taking lens that can be attached to and detached from the camera body 10A.

In FIG. 1, on the front side of the camera body 10A, there are provided a mount section 301 at substantially the center of the front side to which the interchangeable lens 2 is mounted, a lens change button 302 placed to the right of the mount section 301, and a grip section 303 for allowing the imaging apparatus 1A to be gripped. In addition, the camera body 10A has a mode setting dial 305 placed at the left top of the front side, a control-value setting dial 306 placed at the right top of the front side, and a shutter button 307 placed on the top face of the grip section 303.

In addition, the camera body 10A includes, at its top, a flash section 318 configured as a built-in pop-up flash, and a connecting terminal section 319 used when attaching an external flash or the like to the camera body 10A.

The mount section 301 is provided with a connector Ec (see FIG. 5) for establishing electrical connection with the interchangeable lens 2 being mounted, and a coupler 75 (see FIG. 5) for establishing mechanical connection.

The lens change button 302 is a button that is depressed when dismounting the interchangeable 2 mounted to the mount section 301.

The grip section 303 is the portion where the user grips the imaging apparatus 1A during shooting. The grip section 303 is provided with surface irregularities adapted to the finger shape for enhanced fitting. A battery storage compartment and a card storage compartment (not shown) are provided inside the grip section 303. A battery 69B (see FIG. 5) serving as a camera's power supply is stored in the battery storage compartment, and a memory card 67 (see FIG. 5) for recording image data of taken images is removably stored in the card storage compartment. The grip section 303 may be also provided with a grip sensor for detecting whether or not the user has gripped the grip section 303.

The mode setting dial 305 and the control-value setting dial 306 are each formed by a substantially disc-like member that is rotatable in a plane substantially parallel to the top face of the camera body 10A. The mode setting dial 305 is for selectively choosing one of modes or functions included in the imaging apparatus 1A, such as an auto-exposure (AE) control mode and an auto-focus (AF) control mode, various shooting modes such as a still picture shooting mode for shooting a single still picture and a sequential shooting mode for performing sequential shooting, and a playback mode for playing back a recorded image. On the other hand, the control-value setting dial 306 is for setting a control value for each of various functions included in the imaging apparatus 1A.

The shutter button 307 is a press-down switch that can be operated between a "half-pressed state" in which the shutter button 307 is depressed partway, and a "full-pressed state" in which the shutter button 307 is further depressed. Half-pressing the shutter button 307 when in the still picture shooting mode causes execution of preparatory operations (preparatory operations such as setting of exposure control values and focus detection) for shooting a still picture of a subject. Full-pressing the shutter button 307 causes execution of shooting operations (a series of operations including exposing an imaging device 101 (see FIG. 2) to light, applying predetermined image processing to an image signal obtained by the exposure, and recording the resulting image signal into the memory card 67 (see FIG. 5) or the like).

The interchangeable lens 2 functions as a lens window for taking in light (optical image) from a subject, and also functions as a photographic optical system for guiding the subject light to the imaging device 101 placed inside the camera body 10A. The interchangeable lens 2 can be removed from the camera body 10A by depressing the above-described lens change button 302.

Figure 2:
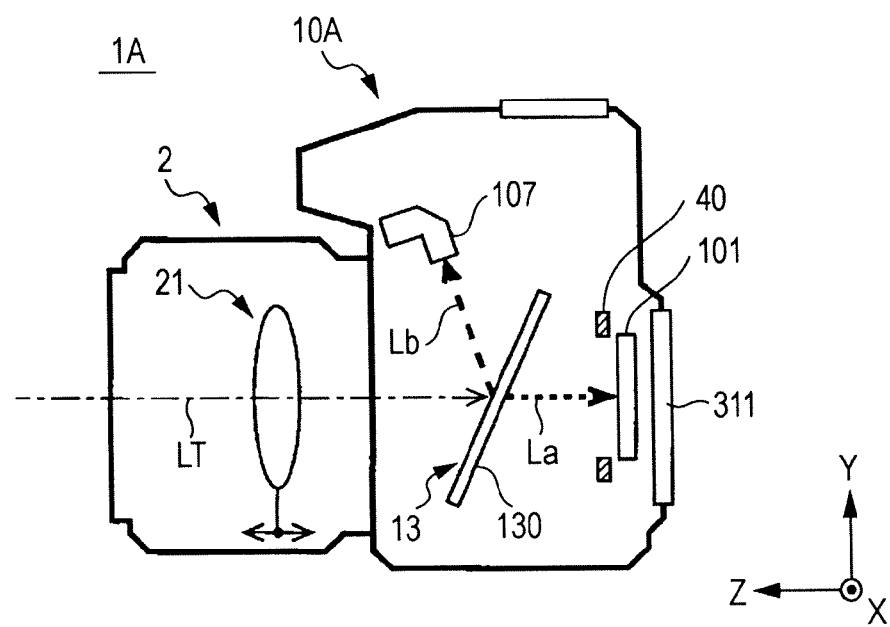
FIG. 2 is a vertical sectional view of an imaging apparatus.

The interchangeable lens 2 includes a lens group 21 made up of a plurality of lens placed serially along an optical axis LT (see FIG. 2). The lens group 21 includes a focus lens 211 (see FIG. 5) for performing focus adjustment, and a zoom lens 212 (see FIG. 5) for performing zooming. Zooming and focus adjustment are performed by driving each of these lenses in the direction of the optical axis LT (see FIG. 2). The interchangeable lens 2 has, at a suitable position on the outer periphery of its barrel, an operation ring that is rotatable along the outer periphery of the barrel. By manual operation or automatic operation, the zoom lens 212 mentioned above is moved in the optical axis direction in accordance with the direction and amount of rotation of the above-mentioned operation ring, and is set to a zoom magnification (shooting magnification) corresponding to the moved position.

[Internal Configuration of Imaging Apparatus 1A]

Next, the internal configuration of the imaging apparatus 1A is described. FIG. 2 is a vertical sectional view of the imaging apparatus 1A. As shown in FIG. 2, the imaging device 101, a mirror section 13, a phase difference AF module 107, and so on are provided inside the camera body 10A.

Figure 3:
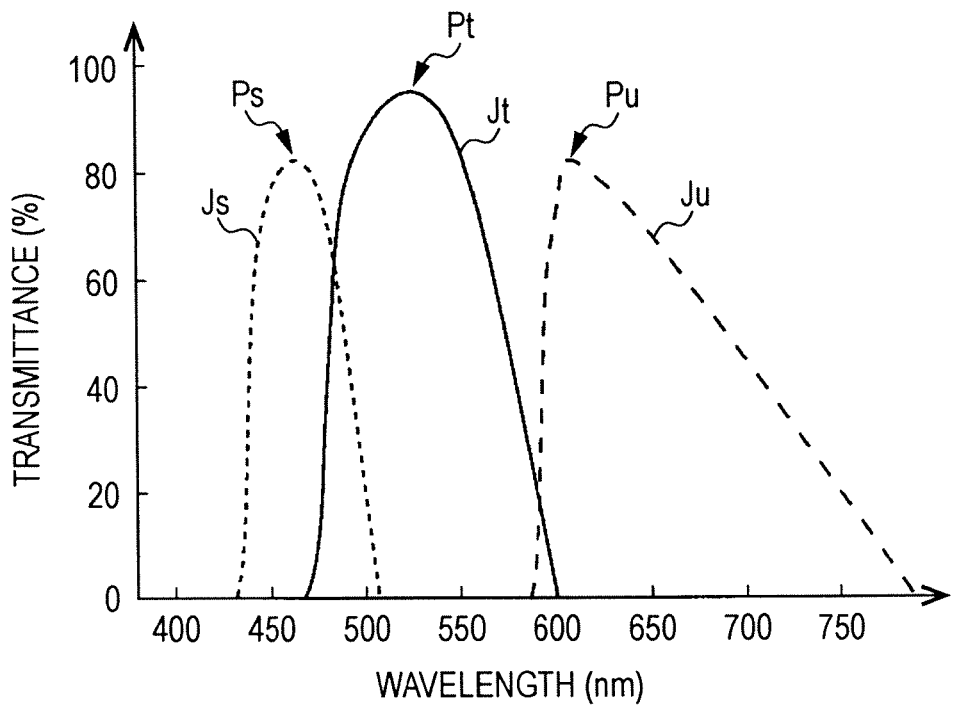
FIG. 3 is a graph showing respective spectral sensitivity characteristics for RGB colors with respect to color filters of an imaging device.

The imaging device 101 is placed in a direction perpendicular to the optical axis LT, on the optical axis LT of the lens group included in the interchangeable lens 2 when the interchangeable lens 2 is mounted to the camera body 10A. As the imaging device 101, a CMOS color area sensor (CMOS-type imaging device) using the Bayer arrangement is used, in which, for example, a plurality of pixels each having a photodiode are two-dimensionally arranged in matrix and, for example, color filters of three primary colors R (red), G (green), and B (Blue) with different spectral characteristics are disposed at a ratio of 1:2:1 on the light receiving surfaces of individual pixels. In the above-mentioned imaging device 101, as shown in FIG. 3, the wavelengths of peaks Ps, Pt, and Pu in the respective spectral sensitivity characteristics Js, Jt, and Ju for the blue (B), green (G), and red (G) colors of the color filters are set to, for example, 470 nm, 530 nm, and 620 nm, respectively. That is, the imaging device 101 functions as a light receiving sensor (first light receiving sensor) that has the spectral sensitivity characteristics Js, Jt, and Ju with the peaks (sensitivity peaks) Ps, Pt, and Pu at the wavelengths (specific wavelengths of light) of 470 nm, 530 nm, and 620 nm in the respective wavelength bands of the RGB three primary colors, and receives transmitted light Lb (FIG. 2) from the half mirror 130.

The imaging device 101 converts an optical image of a subject formed after passing through the interchangeable lens 2 and the half mirror 130, into an analog electrical signal (image signal) of each of R (red), G (green), and B (blue) color components, and outputs the signal as an image signal of each of R, G, and B colors. That is, the imaging device 101 is configured as an image sensor that can receive transmitted light La from the half mirror 130 and output an image signal of the subject.

In front of the imaging device 101 on the optical axis LT mentioned above, the mirror section 13 as a pellicle mirror (stationary mirror) including the half mirror (semi-transparent mirror) 130 is provided in a stationary manner with respect to the camera body 10A. The half mirror 130 is configured to transmit a part of subject light having passed through the interchangeable lens 2 while reflecting the remainder of the light toward the phase difference AF module 107. In other words, the subject light having passed through the interchangeable lens 2 is split into the transmitted light La and the reflected light Lb by the half mirror 130, and an image of the subject is produced on the imaging device 101 that has received the transmitted light La. The configuration of the half mirror 130 will be described in detail later.

Figure 4:
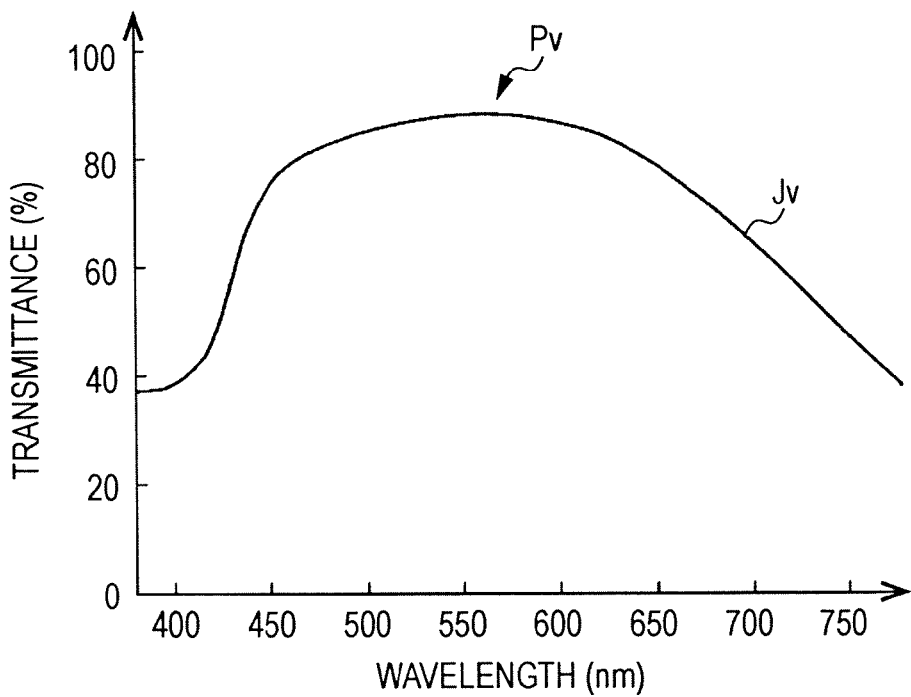
FIG. 4 is a graph showing a spectral sensitivity characteristic with respect to a phase difference AF module.

The phase difference AF module (second light receiving sensor) 107 is configured as a focus detection sensor (AF sensor) that can receive the reflected light Lb (FIG. 2) from the half mirror 130 and output a focus detection signal of the subject. As shown in FIG. 4, the phase difference AF module 107 has a spectral sensitivity characteristic Jv that is dissimilar to and different from the spectral sensitivity characteristics Js to Ju of the imaging device 101, and is plotted as a graph with a gently curved waveform having a peak Pv of spectral sensitivity in the vicinity of 560 nm. The phase difference AF module 107 is disposed diagonally above in front of the half mirror 130. The phase difference AF module 107 receives the reflected light Lb (FIG. 2) from the half mirror 130, and detects the focusing position by focus detection based on a phase difference detection method (hereinafter also referred to as "phase difference AF"). Since the phase difference AF module 107 can receive the reflected light Lb from the half mirror 130 at all times during shooting or the like, constant focus detection is possible with respect to a subject.

A shutter unit 40 is placed in front of the imaging device 101. The shutter unit 40 is configured as a mechanical focal plane shutter including a curtain member that moves vertically, and opens and blocks the optical path of subject light guided to the imaging device 101 along the optical axis LT by opening and closing of the curtain member. The shutter unit 40 can be omitted if the imaging device 101 is an imaging device that can be fully electronically shuttered.

A liquid crystal display (LCD) 311 is provided on the back of the camera body 10A. The LCD 311 includes a color liquid crystal panel that can display images. The LCD 311 performs display of images captured by the imaging device 101, display of playback of recorded images, and the like, and also displays a screen for setting functions or modes included in the imaging apparatus 1A. When framing the subject prior to actual shooting, the LCD 311 performs a live view (preview) display such that the subject is displayed in an animated form on the basis of image signals sequentially generated by the imaging device 101 that receives the transmitted light La from the half mirror 130.

[Electrical Configuration of Imaging Apparatus 1A]

Figure 5:
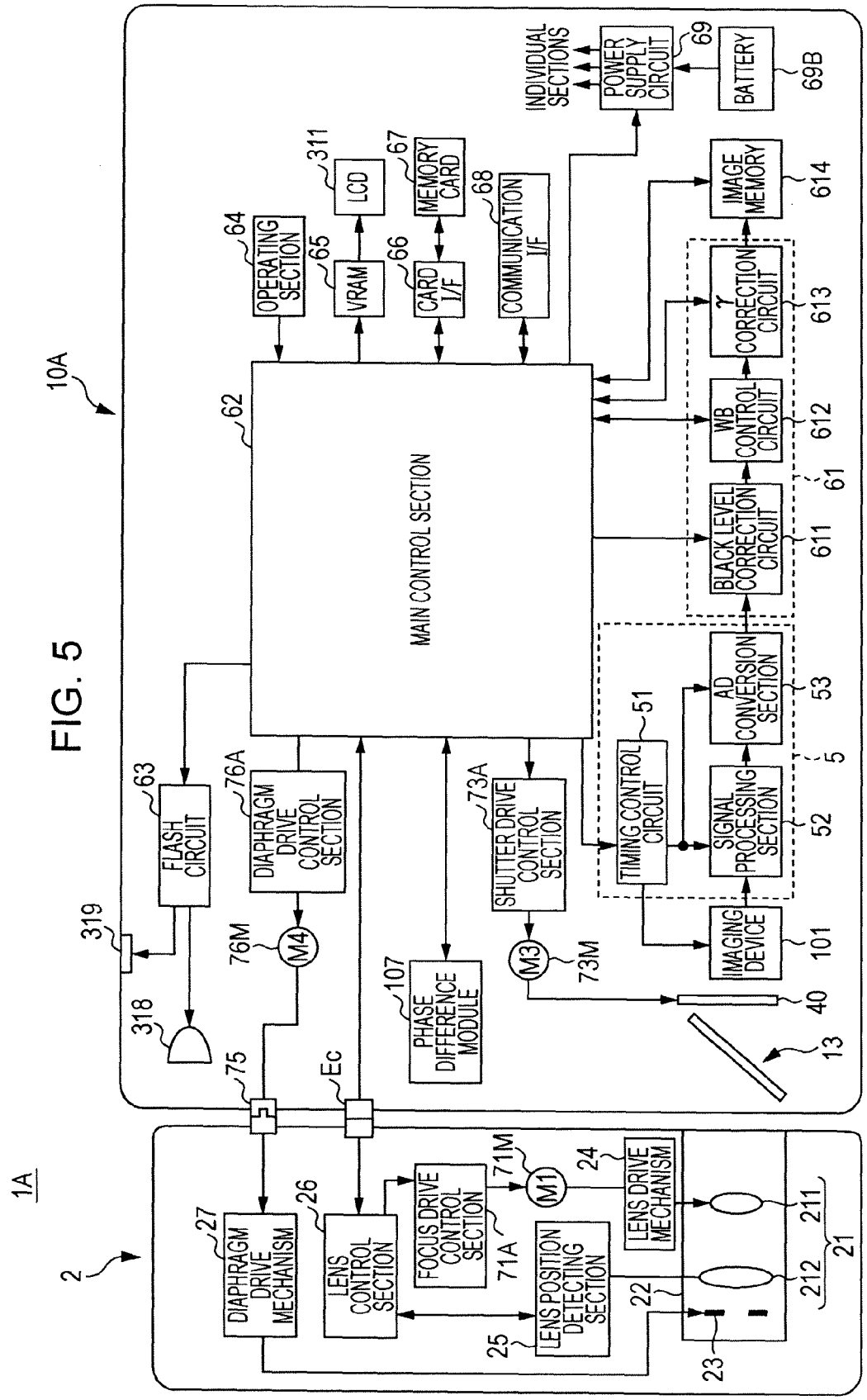
FIG. 5 is a block diagram showing the electrical configuration of an imaging apparatus.

FIG. 5 is a block diagram showing the electrical configuration of the imaging apparatus 1A. Here, components or the like that are the same as those in FIGS. 1 and 2 are denoted by the same symbols. For the convenience of explanation, the electrical configuration of the interchangeable lens 2 is first described.

The interchangeable lens 2 includes, in addition to the lens group 21 described above, a lens drive mechanism 24, a lens position detecting section 25, a lens control section 26, and a diaphragm drive mechanism 27.

In the lens group 21, the focus lens 211 and the zoom lens 212, and a diaphragm 23 for adjusting the amount of light made incident on the imaging device 101 provided to the camera body 10A are held in the direction of the optical axis LT (FIG. 2) inside a barrel 22. The lens group 21 takes in an optical image of a subject, and causes the image to be formed on the imaging device 101. In AF control, focus adjustment is performed by driving the focus lens 211 in the direction of the optical axis LT by an AF actuator 71M inside the interchangeable lens 2.

A focus drive control section 71A generates, on the basis of an AF control signal supplied from a main control section 62 via the lens control section 26, a drive control signal for the AF actuator 71M necessary for moving the focus lens 211 to a focusing position. The AF actuator 71M is formed by a stepping motor or the like, and gives a lens driving force to the lens drive mechanism 24.

The lens drive mechanism 24 is formed by, for example, a helicoid and a gear (not shown) for rotating the helicoid. The lens drive mechanism 24 receives a driving force from the AF actuator 71M to drive the focus lens 211 and the like in a direction parallel to the optical axis LT. The direction and amount of movement of the focus lens 211 are in accordance with the rotational direction and the number of revolutions of the AF actuator 71M.

The lens position detecting section 25 includes an encode plate on which a plurality of code patterns are formed at a predetermined pitch in the direction of the optical axis LT with a predetermined pitch within the movement range of the lens group 21, and an encoder brush that moves integrally with the lens while in sliding contact with this encode plate. The lens position detecting section 25 detects the amount of movement of the lens group 21 at the time of focus adjustment.

The lens control section 26 is formed by, for example, microcomputer with built-in memories, such as a ROM for storing a control program and a flash memory for storing data related to state information.

The lens control section 26 also has a communication facility for communicating with the main control section 62 of the camera body 10A via the connector Ec. Thus, the lens control section 26 can transmit, for example, state information data such as the focal length, exit pupil position, aperture, focus distance, and amount of ambient light of the lens group 21, and positional information on the focus lens 211 detected by the lens position detecting section 25, to the main control section 62. In addition, the lens control section 26 can receive, for example, data on the amount of drive of the focus lens 211 from the main control section 62.

The diaphragm drive mechanism 27 receives a driving force from a diaphragm drive actuator 76M via a coupler 75, and changes the aperture diameter of the diaphragm 23.

Next, the electric configuration of the camera body 10A is described. In addition to the imaging device 101, the shutter unit 40, and so on described above, the camera body 10A includes an analog front-end (AFE) 5, an image processing section 61, an image memory 614, the main control section 62, a flash circuit 63, an operating section 64, a VRAM 65, a card I/F 66, and a memory card 67. Also, the camera body 10A includes a communication I/F 68, a power supply circuit 69, the battery 69B, a shutter drive control section 73A, a shutter drive actuator 73M, a diaphragm drive control section 76A, and the diaphragm drive actuator 76M.

As described above, the imaging device 101 is formed by a CMOS color area sensor. A timing control circuit 51 described later controls imaging operations such as the starting (and ending) of exposure of the imaging device 101, selection of the outputs of individual pixels included in the imaging device 101, and readout of pixel signals.

The AFE 5 supplies the imaging device 101 with timing pulses for causing the imaging device 101 to perform predetermined operations. Also, the AFE 5 applies predetermined signal processing to an image signal of a subject outputted from the imaging device 101, converts the signals into a digital signal, and outputs the digital signal to the image processing section 61. The AFE 5 includes the timing control circuit 51, a signal processing section 52, an A/D conversion section 53, and the like.

The timing control circuit 51 generates predetermined timing pulses (pulses for producing a vertical scanning pulse $\phi Vn$, a horizontal scanning pulse $\phi Vm$, a reset signal $\phi Vr$, and so on) on the basis of a reference clock outputted from the main control section 62, and outputs the timing pulses to the imaging device 101 to control imaging operations of the imaging device 101. In addition, the timing control circuit 51 outputs a predetermined timing pulse to each of the signal processing section 52 and the A/D conversion section 53 to control the operations of the signal processing section 52 and A/D conversion section 53.

The signal processing section 52 applies predetermined analog signal processing to an analog image signal outputted from the imaging device 101. The signal processing section 52 has a correlated double sampling (CDS) circuit, an automatic gain control (AGC) circuit, a clamp circuit, and so on. The AGC circuit can amplify an image signal generated by the imaging device 101 in such a way that makes its gain variable. This gain variation enables changing of ISO sensitivity in a manner corresponding to a silver-salt film. The A/D conversion section 53 converts each of analog R, G, and B image signals outputted from the signal processing section 52 into a digital image signal of a plurality of bits (e.g., 12 bits) on the basis of timing pulses outputted from the timing control circuit 51.

The image processing section 61 creates an image file by performing predetermined signal processing on image data outputted from the AFE 5. The image processing section 61 includes a black level correction circuit 611, a white balance control circuit 612, a gamma correction circuit 613, and so on. Image data taken in to the image processing section 61 is temporarily written into the image memory 614 in synchronization with reading from the imaging device 101. Then, this image data written into the image memory 614 is accessed to execute processing in individual blocks of the image processing section 61.

The black level correction circuit 611 corrects the black level of each of the R, G, and B digital image signals obtained through A/D conversion by the A/D conversion section 53 to a reference black level.

The white-balance control circuit 612 performs level conversion (white balance (WB) adjustment) of each of digital signals of the red (R), green (G), and blue (B) color components on the basis of a reference white according to the light source. That is, on the basis of WB adjustment data supplied from the main control section 62, the white-balance control circuit 612 identifies a portion that is estimated to be originally a white region of a subject to be photographed from data such as luminance or chroma, finds the respective averages of the R, G, and B components, the G/R ratio, and the G/B ratio in that portion, and performs level correction using these values as R and B correction gains.

The gamma correction circuit 613 corrects tone characteristics of image data on which the WB adjustment has been performed. More specifically, the gamma correction circuit 613 performs non-linear conversion and offset adjustment of the levels of image data using gamma correction tables set in advance for the individual color components.

The image memory 614 is a memory which, when in the shooting mode, temporarily stores image data outputted from the image processing section 61, and is used as a work area for the main control section 62 to execute predetermined processing on this image data. When in the playback mode, the image memory 614 temporarily stores image data read from the memory card 67.

The main control section 62 includes a CPU that acts as a computer, a ROM for storing a control program and the like, and a RAM for temporarily storing data. The main control section 62 controls the operations of individual sections of the imaging apparatus 1A.

The flash circuit 63 is a flash circuit which, when in a flash shooting mode, controls the amount of light emitted by the flash section 318 or an external flash connected to the connecting terminal section 319 to an amount set by the main control section 62.

The operating section 64 includes the shutter button 307 and so one described above. The operating unit 64 is used to input operational information to the main control section 62.

The VRAM 65 is a buffer memory that has a storage capacity for storing image signals corresponding to the number of pixels of the LCD 311, and is provided between the main control section 62 and the LCD 311. The card I/F 66 is an interface that enables transmission and reception of signals to and from the memory card 67 and the main control section 62. The memory card 67 is a recording medium for saving image data generated by the main control section 62. The communication I/F 68 is an interface that enables transmission of image data and the like to a personal computer or other external devices.

The power supply circuit 69 is, for example, a constant voltage circuit. The power supply circuit 69 generates voltages for driving the entire imaging apparatus 1A, including control sections such as the main control section 62, the imaging device 101, and other various drive sections. The supply of electricity to the imaging device 101 is controlled by a control signal supplied from the main control section 62 to the power supply circuit 69. The battery 69B is a secondary battery such as a nickel metal hydride battery or a primary battery such as an alkaline battery. The battery 69B is a power supply that supplies electric power to the entire imaging apparatus 1A.

The shutter drive control section 73A generates a drive control signal for the shutter driving actuator 73M on the basis of a control signal supplied from the main control section 62. The shutter drive actuator 73M is an actuator that performs opening and closing drives (opening and closing operations) of the shutter unit 40.

The diaphragm drive control section 76A generates a drive control signal for the diaphragm drive actuator 76M on the basis of a control signal supplied from the main control section 62. The diaphragm drive actuator 76M gives a driving force to the diaphragm driving mechanism 27 via the coupler 75.

[Configuration of Half Mirror 130]

Figure 6:
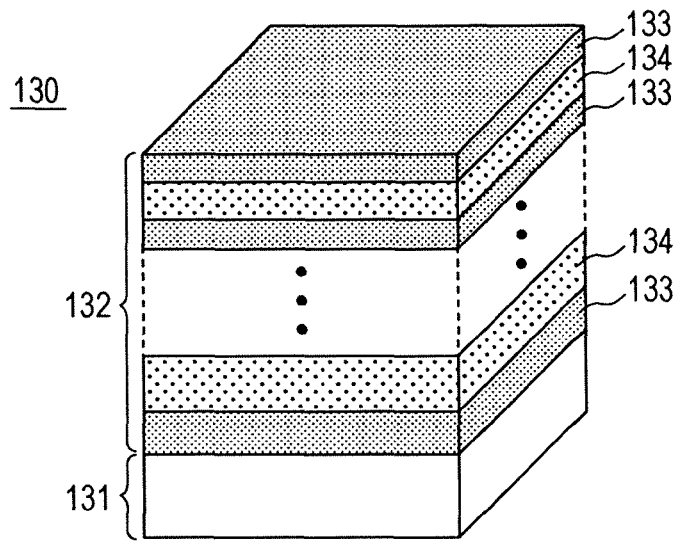
FIG. 6 is a view for explaining the sectional configuration of a half mirror.

FIG. 6 is a view for explaining the sectional configuration of the half mirror 130.

The half mirror 130 of the mirror section 13 includes a mirror substrate (mirror base) 131, and an inorganic layer (layer of inorganic material) 132 deposited and formed on the mirror substrate 131.

As the mirror substrate 131, for example, a film can be employed. More specifically, the film employed as the mirror substrate is configured as, for example, an optically transparent film having a transmittance of 90% (reflectance of 10%), and is formed of a material having optical isotropy, for example, a cycloolefin polymer or polycarbonate. Since the half mirror 130 employs a film formed of a material having optical isotropy and a predetermined rigidity as the mirror substrate 131 in this way, there is no fear of cracking like a glass plate and breakage can be prevented, and also a loss in the amount of light can be reduced in comparison to a film having optical anisotropy.

The inorganic layer 132 includes, for example, a layer 133 of high refractive index material (H) such as niobium pentoxide ($Nb_2O_5$), and a layer 134 of low refractive index material (L) such as silicon dioxide ($SiO_2$), which are laminated alternately. For example, by varying the number of laminations, layer thickness, and the like of the inorganic layer 132, it is possible to adjust the spectral characteristics of the half mirror 130 with respect to the transmitted light La (FIG. 2) and the reflected light Lb (FIG. 2). In other words, by adjusting the number of laminations and film thickness of the inorganic layer 132 formed on the mirror substrate 131 as appropriate, the spectral transmission characteristics and spectral reflection characteristics described below can be realized with the half mirror 130.

Figure 7:
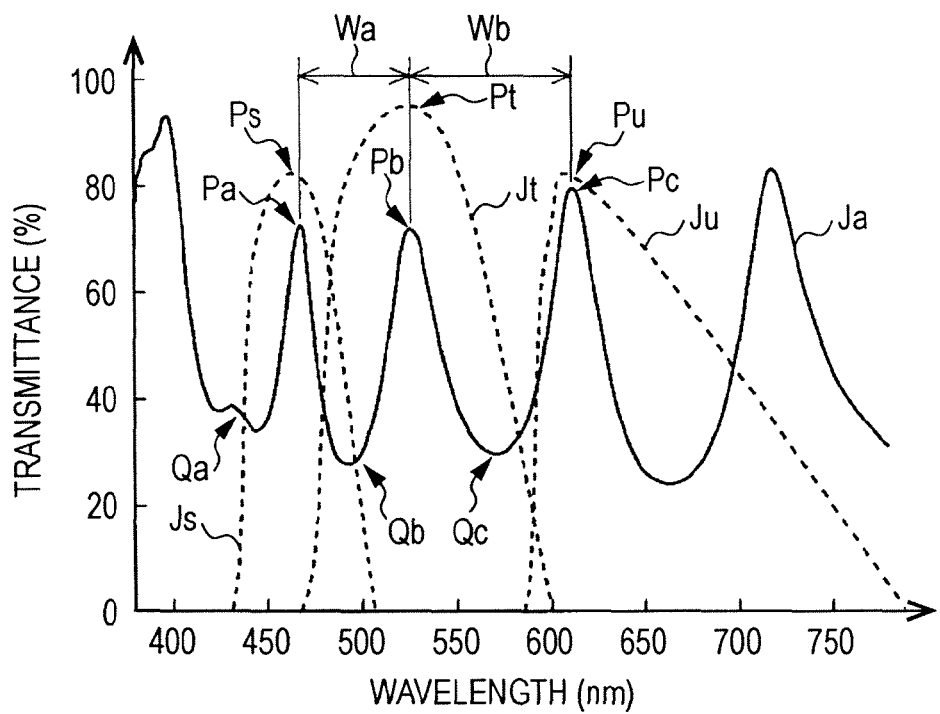
FIG. 7 is a graph showing a spectral transmission characteristic with respect to a half mirror.
Figure 8:
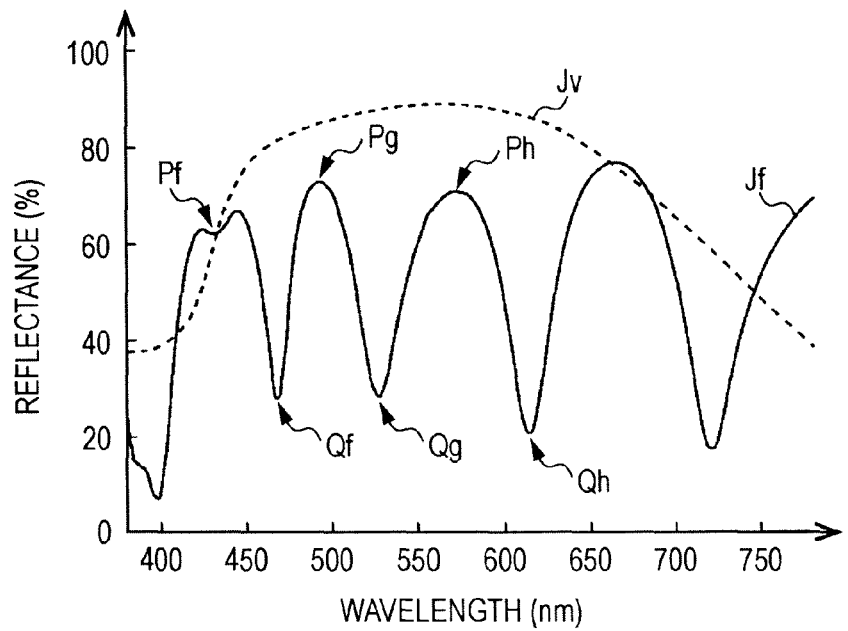
FIG. 8 is a graph showing a spectral reflection characteristic with respect to a half mirror.

FIG. 7 is a graph showing a spectral transmission characteristic Ja with respect to the half mirror 130. FIG. 8 is a graph showing a spectral transmission characteristic Jf with respect to the half mirror 130. In FIGS. 7 and 8, the horizontal axis represents wavelength of light, and the vertical axis represents transmittance and reflectance. In FIG. 7, the spectral sensitivity characteristics Js, Jt, and Ju (FIG. 3) of the imaging device 101 are indicated by broken lines, and in FIG. 8, the spectral sensitivity characteristic Jv (FIG. 4) of the phase difference AF module 107 is indicated by a broken line.

As shown in FIG. 7, the spectral transmission characteristic Ja of the half mirror 130 is represented by a graph waveform that meanders up and down and has a plurality of peaks (crests) including peaks Pa, Pb, and Pc, and a plurality of bottoms (valleys) including bottoms Qa, Qb, and Qc. In this regard, the wavelengths of the peaks (transmission peaks) Pa, Pb, and Pc in the spectral transmission characteristic Ja of the half mirror 130 are matched with those of the peaks Ps, Pt, and Pu in the respective spectral sensitivity characteristics Js, Jt, and Ju for blue, green, and red of the imaging device 101. Accordingly, in each of the photodiodes of the imaging device 101 which detects an amount of received light obtained as a multiplication of transmittances with respect to the spectral transmission characteristic Ja of the half mirror 130 and each of the spectral sensitivity characteristics Js to Ju of the color filters, it is possible to realize a level of light reception that compares favorably with that of a half mirror according to the related art with such a spectral transmission characteristic that its transmittance (for example, 70%) remains substantially constant irrespective of the wavelength of light. A more specific description in this regard is given below.

Figure 9:
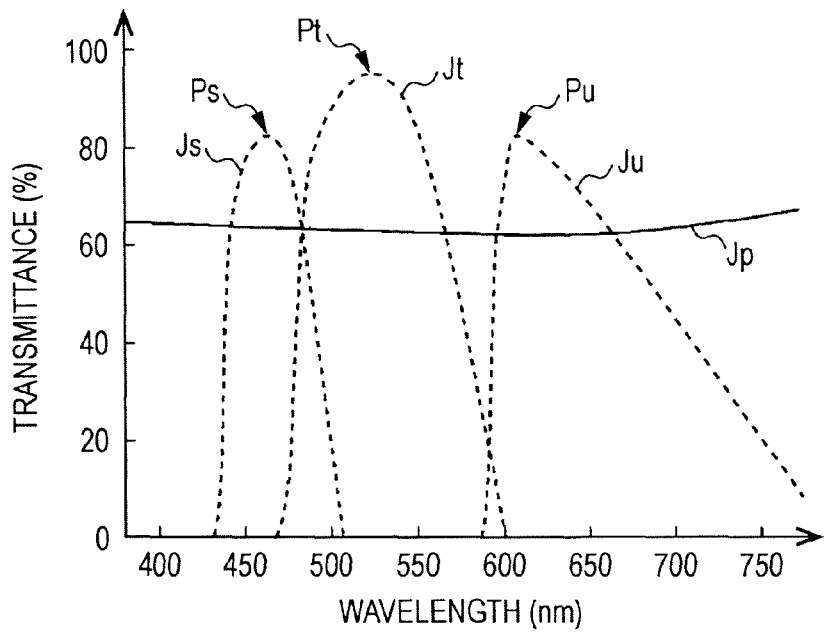
FIG. 9 is a graph showing a spectral transmission characteristic with respect to a half mirror according to the related art.

As shown in FIG. 9, a half mirror according to the related art has such a spectral transmittance characteristic Jp that its transmittance is substantially constant irrespective of the wavelength of light. Now, comparing the spectral transmittance characteristic Jp according to the related art with the spectral transmittance characteristic Ja according to this embodiment shown in FIG. 7, for wavelengths in the vicinity of the respective peaks Ps to Pu in the spectral sensitivity characteristics Js to Ju of the imaging device 101, the corresponding transmittances are equal. Therefore, at the imaging device 101 that receives the transmitted light La from the half mirror 130 according to this embodiment, it is possible to obtain a photographed image equivalent to that obtained by using the half mirror according to the related art.

On the other hand, the spectral reflection characteristic Jf of the half mirror 130 basically has a waveform that is a vertical mirror flip of the spectral transmission characteristic Ja (FIG. 7) as shown in FIG. 8. Therefore, the spectral reflection characteristic Jf has a plurality of peaks including peaks Pf to Pf corresponding to the bottoms Qa to Qc shown in FIG. 7, and a plurality of bottoms Qf to Qh corresponding to the peaks Pa to Pc shown in FIG. 7.

The above-mentioned spectral transmission characteristic Ja (and spectral reflection characteristic Jf) of the half mirror 130 can be realized by alternately laminating, for example, 13 layers of niobium pentoxide and silicon dioxide in the inorganic layer 132 as follows from the mirror substrate 131 side.
[1st layer] niobium pentoxide: 125.34 nm
[2nd layer] silicon dioxide: 149.34 nm
[3rd layer] niobium pentoxide: 8.12 nm
[4th layer] silicon dioxide: 129.98 nm
[5th layer] niobium pentoxide: 53.73 nm
[6th layer] silicon dioxide: 201.54 nm
[7th layer] niobium pentoxide: 81.73 nm
[8th layer] silicon dioxide: 174.00 nm
[9th layer] niobium pentoxide: 97.89 nm
[10th layer] silicon dioxide: 161.52 nm
[11th layer] niobium pentoxide: 158.48 nm
[12th layer] silicon dioxide: 98.12 nm
[13th layer] niobium pentoxide: 87.00 nm With the half mirror 130 having the spectral transmission characteristic Ja and the spectral reflection characteristic Jf described above, a relatively large amount of light is received by the phase difference AF module 107 that receives the reflected light Lb (FIG. 2) from the half mirror 130. This is described more specifically below.

Figure 10:
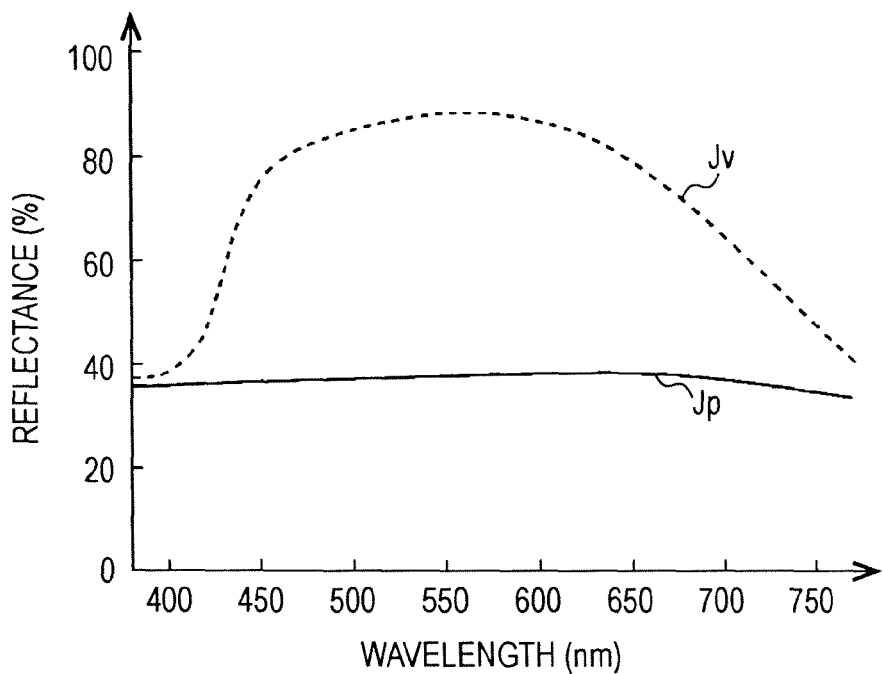
FIG. 10 is a graph showing a spectral reflection characteristic with respect to a half mirror according to the related art.

The half mirror according to the related art has a spectral reflection characteristic represented by a waveform that is a vertical mirror flip of the spectral transmission characteristic Jp shown in FIG. 9 described above, more specifically, a spectral reflection characteristic Jq as shown in FIG. 10 such that its transmittance is substantially constant at about 30% irrespective of the wavelength of light. Now, comparing the spectral reflection characteristic Jq of the half mirror according to the related art with the spectral reflection characteristic Jf (FIG. 8) of the half mirror 130 according to this embodiment, it is appreciated that with the half mirror 130 according to this embodiment, in the wavelength band (for example, about 400 nm to 700 nm) of relatively high sensitivity of the phase difference AF module 107, a large amount of light is incident on the phase difference AF module 107 in comparison to the related art. Since the half mirror 130 according to this embodiment enables an increase in the amount of reflected light in this way, fast focus detection is possible even for a dark subject, thereby achieving an improvement in low luminance performance.

In the imaging apparatus 1A described above, as shown in FIG. 7, the wavelengths of the peaks Pa to Pc in the spectral transmission characteristic Ja of the half mirror 130 are matched with those of the peaks Ps to Pu of the spectral sensitivity characteristics Js to Ju of the imaging device 101. Thus, as indicated by the spectral reflection characteristic Jf shown in FIG. 8, a deficiency in the amount of the reflected light Lb (FIG. 2) at the half mirror 130 can be reduced, thereby improving the low luminance performance of the phase difference AF module 107 that receives the reflected light Lb.

Figure 11:
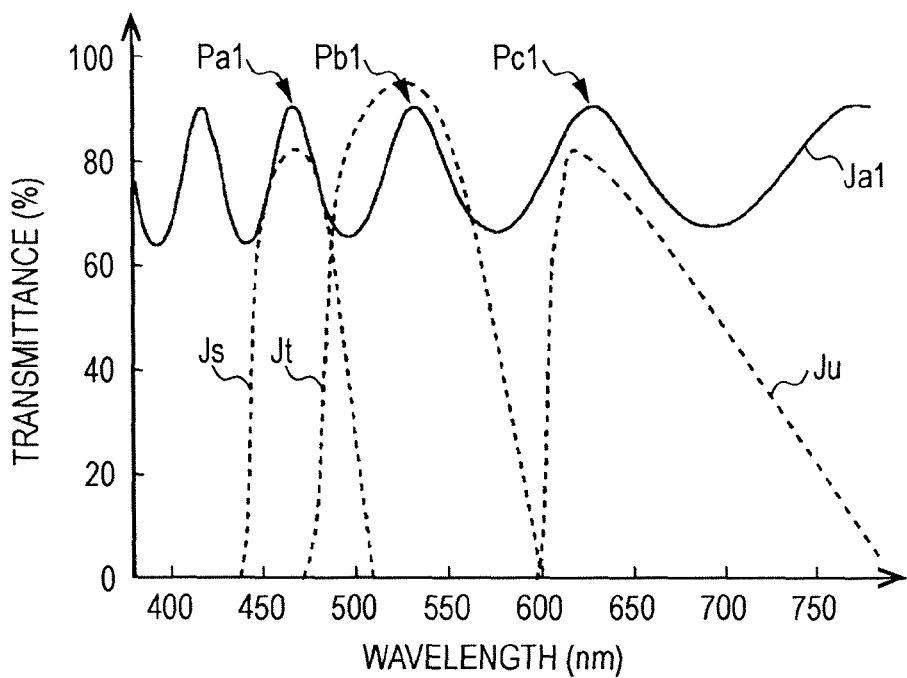
FIG. 11 is a graph showing another spectral transmission characteristic with respect to a half mirror.
Figure 12:
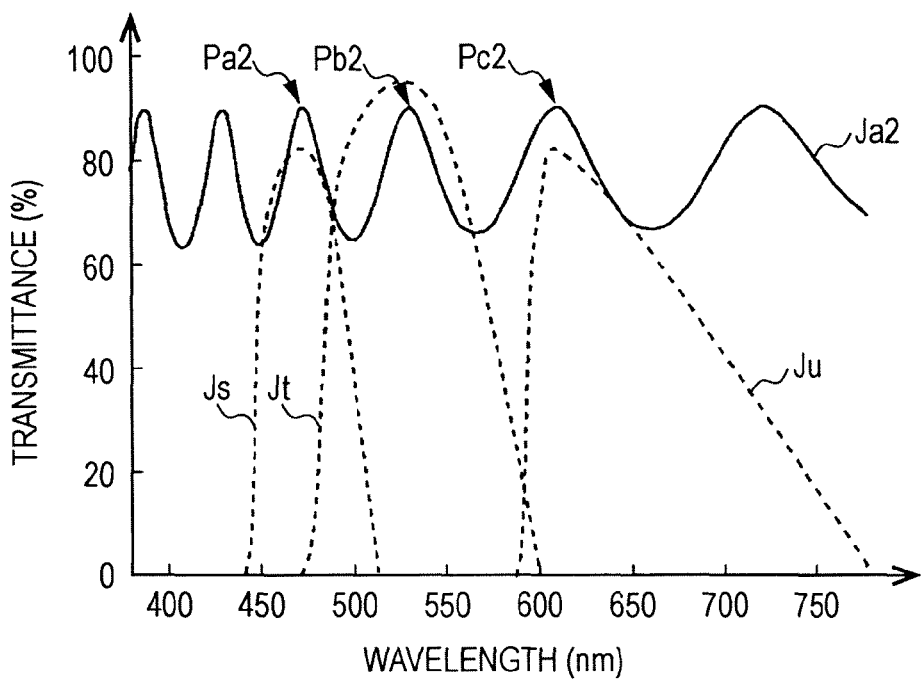
FIG. 12 is a graph showing another spectral transmission characteristic with respect to a half mirror.
Figure 13:
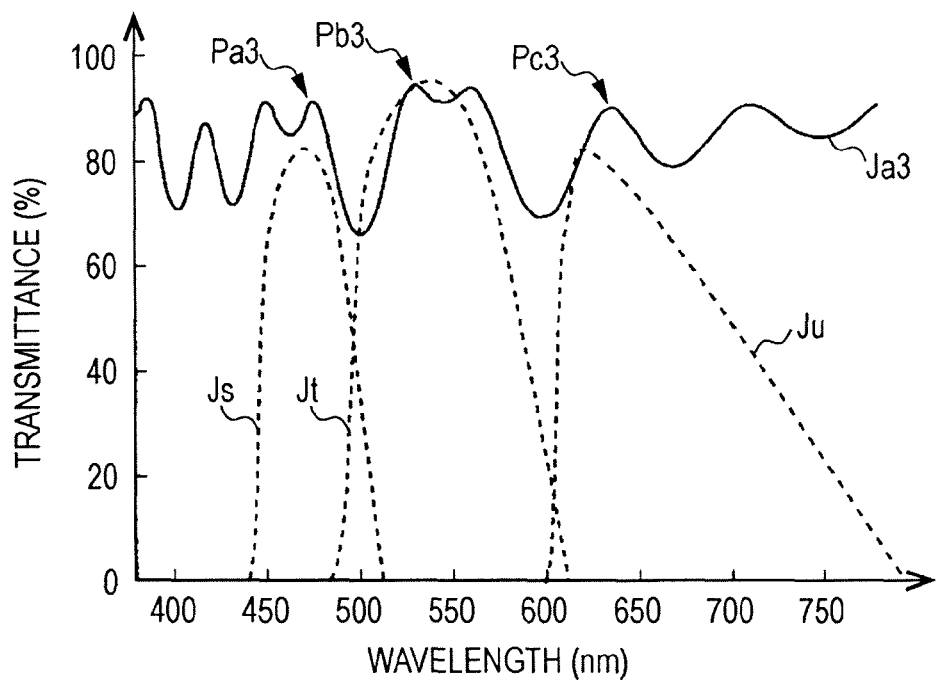
FIG. 13 is a graph showing another spectral transmission characteristic with respect to a half mirror.

The imaging apparatus 1A may not necessary employ the half mirror 130 having the spectral transmission characteristic Ja shown in FIG. 7, but may employ each of half mirrors having the spectral transmission characteristics shown in FIGS. 11, 12, and 13. These spectral transmission characteristics are described in order below.

A spectral transmission characteristic Ja1 shown in FIG. 11 is such that, with respect to an imaging device whose peaks in the spectral sensitivity characteristics Js to Ju with respect to the RGB color filters are set at wavelengths of 470 nm, 530 nm, and 630 nm for B, G, and R, respectively, the wavelengths of peaks Pa1, Pb1, and Pc1 of the spectral transmission characteristic Ja1 are matched with these peak wavelengths. In this regard, the spectral transmission characteristic Ja1 shown in FIG. 11 can be realize by, for example, forming a single layer of niobium pentoxide at a film thickness of 711.00 nm in the inorganic layer 132.

A spectral transmission characteristic Ja2 shown in FIG. 12 is such that, with respect to an imaging device whose peaks in the spectral sensitivity characteristics Js to Ju with respect to the RGB color filters are set at wavelengths of 470 nm, 530 nm, and 620 nm for B, G, and R, respectively, the wavelengths of peaks Pa2, Pb2, and Pc2 of the spectral transmission characteristic Ja2 are matched with these peak wavelengths. In this regard, the spectral transmission characteristic Ja2 shown in FIG. 12 can be realize by, for example, laminating two layers of niobium pentoxide and silicon dioxide in the following manner from the mirror substrate 131 side in the inorganic layer 132.
[1st layer] niobium pentoxide: 824.76 nm
[2nd layer] silicon dioxide: 10.00 nm A spectral transmission characteristic Ja3 shown in FIG. 13 is such that, with respect to an imaging device whose peaks in the spectral sensitivity characteristics Js to Ju with respect to the RGB color filters are set at wavelengths of 470 nm, 550 nm, and 640 nm for B, G, and R, respectively, the wavelengths of peaks Pa3, Pb3, and Pc3 of the spectral transmission characteristic Ja3 are matched with these peak wavelengths. In this regard, the spectral transmission characteristic Ja3 shown in FIG. 13 can be realize by, for example, laminating two layers of niobium pentoxide and silicon dioxide in the following manner from the mirror substrate 131 side in the inorganic layer 132.

[1st layer] niobium pentoxide: 490.00 nm
[2nd layer] silicon dioxide: 1363.50 nm For each of the spectral transmission characteristics Ja1 to Ja3 (FIGS. 11 to 13) mentioned above, a waveform that is a vertical mirror flip of the corresponding spectral transmission characteristic is the spectral reflection characteristic of the half mirror. Therefore, similarly to the half mirror 130 described above, the amount of reflected light reflected at the half mirror can be increased, thereby improving the low luminance performance of the phase difference AF module.

Second Embodiment

[Configuration of Imaging Apparatus]

Figure 14:
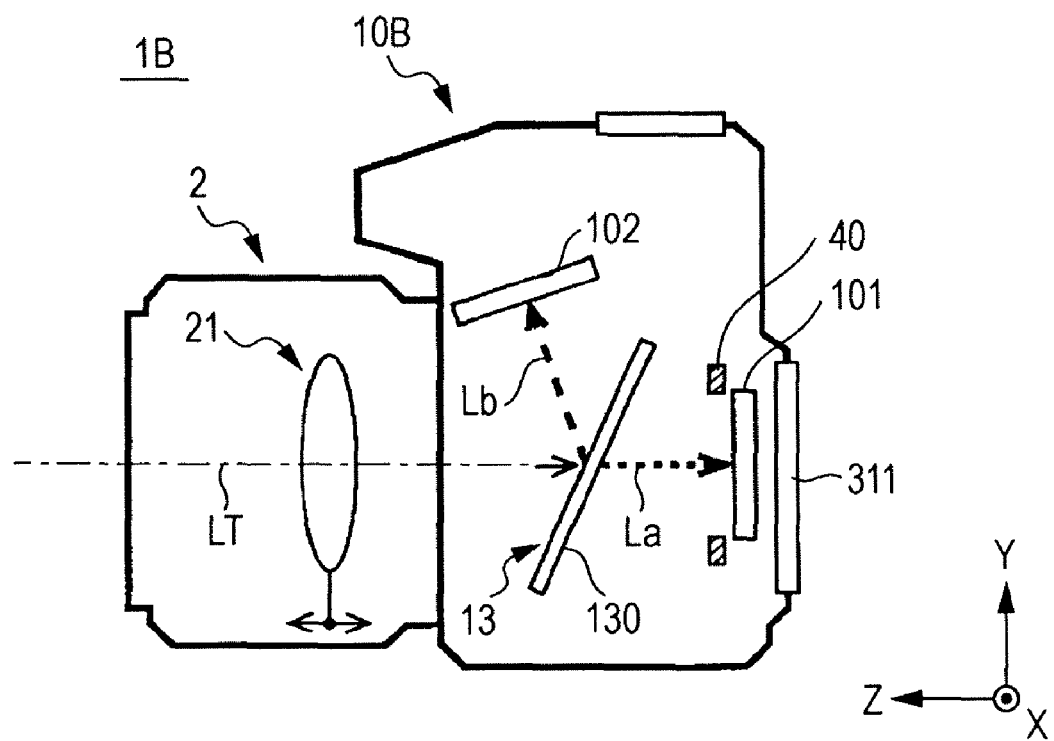
FIG. 14 is a vertical sectional view of an imaging apparatus according to a second embodiment of the present invention.
Figure 15:
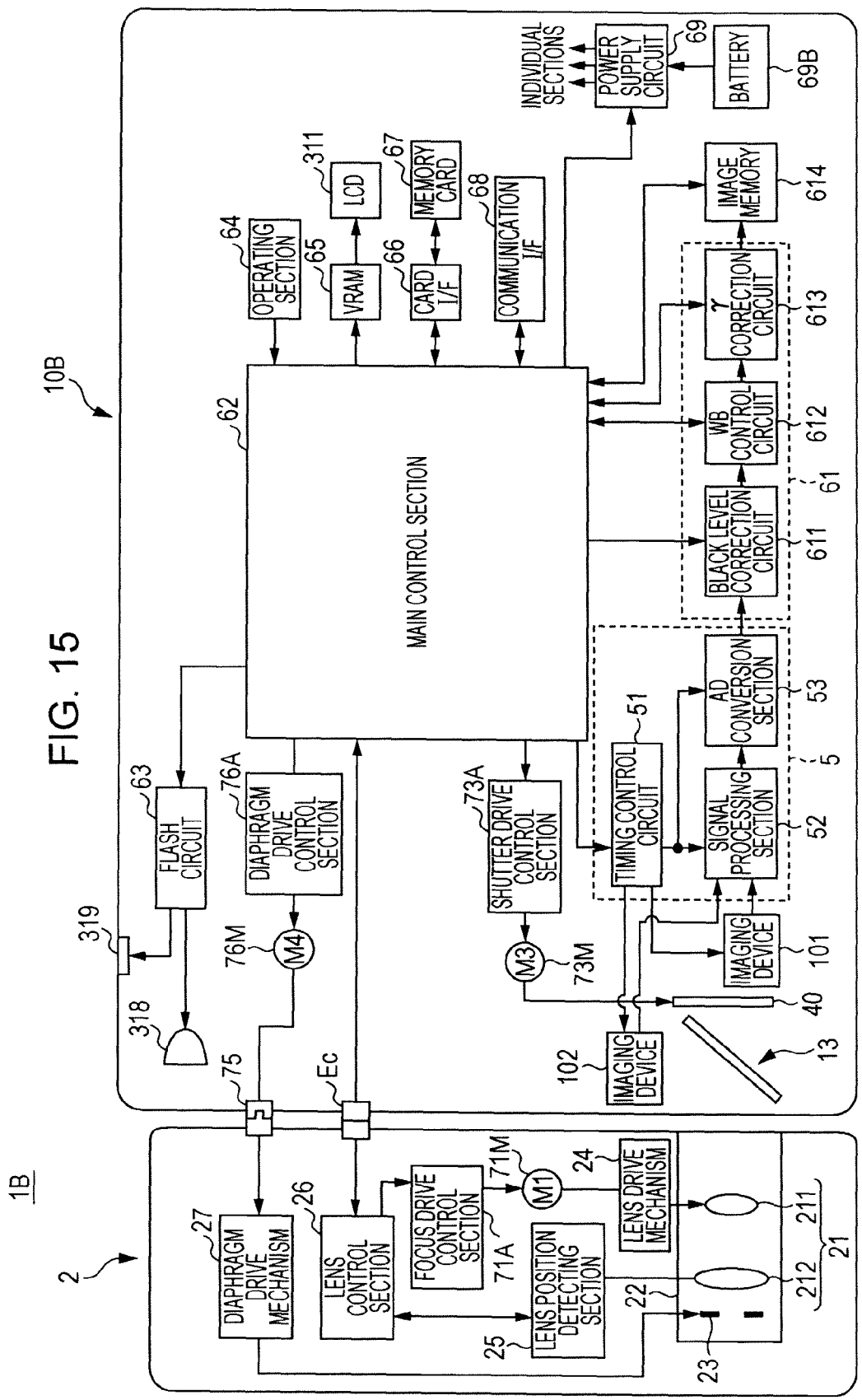
FIG. 15 is a block diagram showing the electrical configuration of an imaging apparatus.

FIG. 14 is a vertical sectional view of an imaging apparatus 1B according to a second embodiment of the present invention. FIG. 15 is a block diagram showing the electrical configuration of the imaging apparatus 1B.

Although the imaging apparatus 1B according to the second embodiment has the same exterior configuration as the imaging apparatus 1A according to the first embodiment shown in FIG. 1, the imaging apparatus 1B differs in that instead of the phase difference AF module 107 according to the first embodiment, an imaging device (image sensor) 102 is installed inside a camera body 10B as a light receiving sensor that receives the reflected light Lb from the half mirror 130.

Although the imaging device 102 has a configuration equivalent to that of the imaging device 101, as described below, the imaging device 102 differs in its spectral sensitivity characteristics with respect to color filters.

[Spectral Sensitivity Characteristics of Imaging Device 102]

Figure 16:
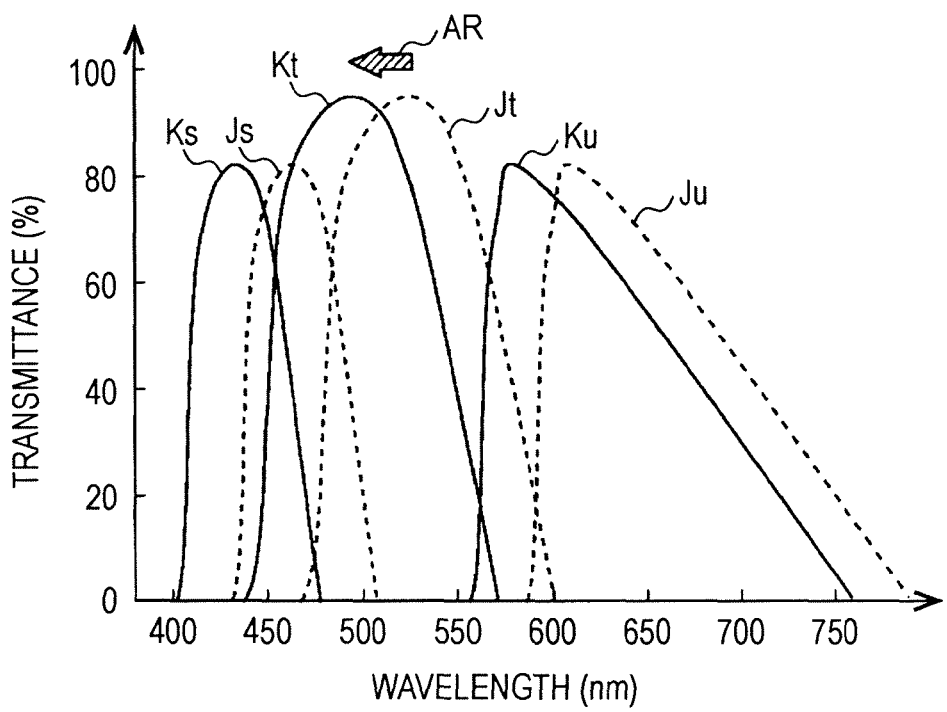
FIG. 16 is a graph for explaining spectral sensitivity characteristics with respect to color filters of an imaging device.
Figure 17:
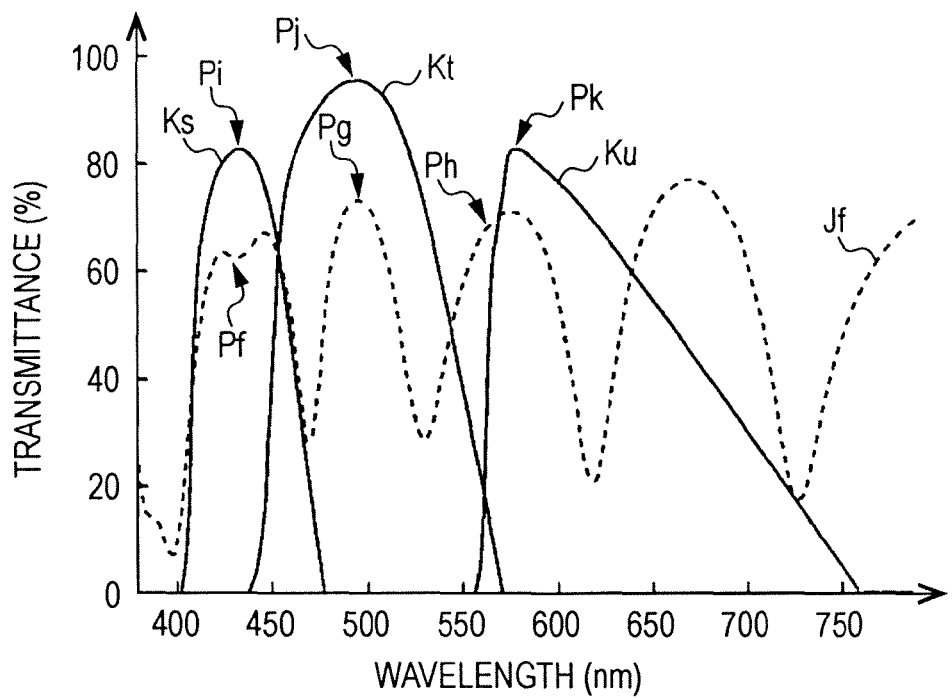
FIG. 17 is a graph for explaining spectral sensitivity characteristics with respect to color filters of an imaging device.

FIGS. 16 and 17 are graphs for explaining spectral sensitivity characteristics Ks, Kt, and Ku with respect to color filters of the imaging device 102. In FIGS. 16 and 17, the horizontal axis represents the wavelength of light, and the vertical axis represents transmittance. In FIG. 16, the spectral sensitivity characteristics Js, Jt, and Ju of the imaging device 101 shown in FIG. 3 are indicated by broken lines, and in FIG. 17, the spectral reflection characteristic Jf of the half mirror 130 shown in FIG. 8 is indicated by a broken line.

The spectral sensitivity characteristics Ks to Ku of the imaging device 102 for the respective colors of RGB color filters correspond to those obtained by parallel translation in a direction AR of lower wavelengths of the spectral sensitivity characteristics Js to Ju (broken lines) of the imaging device 101. In other words, the imaging device 102 has the spectral sensitivity characteristics Ks to Ku obtained by shifting the spectral sensitivity characteristics Js to Ju of the imaging device 101 by a predetermined amount along the direction AR of wavelength. In this regard, this predetermined amount, that is, the amount of shift in the direction AR corresponds to half of the wavelength difference between adjacent peaks Pa to Pc among the peaks (sensitivity peaks) Pa to Pc (FIG. 7) in the respective wavelength bands of the three primary colors (RGB) of the color filters, for example, half of the mean value of a wavelength difference Wa (FIG. 7) between the peaks Pa and Pb and a wavelength difference Wb (FIG. 7) between the peaks Pb and Pc in the spectral transmission characteristic Ja of the half mirror 130.

Thus, as shown in FIG. 17, the wavelengths of peaks (sensitivity peaks) Pi to Pk in the spectral sensitivity characteristics Ks to Ku of the imaging device 102 match the wavelengths of peaks (reflection peaks) Pf to Ph in the spectral reflection characteristic Jf of the half mirror 130, respectively, thereby making it possible to efficiently receive the RGB colors of the reflected light Lb (FIG. 14). As a result, it is also possible for the imaging device 102 that receives the reflected light Lb to realize a level of light reception for each RGB color equivalent to that of the imaging device 101 that receives the transmitted light La (FIG. 14).

The imaging apparatus 1B described above can reduce a deficiency in the amount of the reflected light Lb at the half mirror 130, in the same manner as in the first embodiment. As a result, it is also possible for the imaging device 102 that receives this reflected light Lb to produce a subject image equivalent to that produced by the imaging device 101 that receives the transmitted light La.

<Modifications>

In each of the above-mentioned embodiments, a film is employed as the mirror substrate (mirror base) of the half mirror. However, this should not be construed restrictively. It is also possible to employ a sheet glass that is endowed with rigidity itself on the basis of its hold method that takes crack prevention into consideration.

A cycloolefin polymer or polycarbonate may not necessarily be used for the film serving as the mirror substrate of the half mirror in each of the above-mentioned embodiments. It is also possible to use a film made of another material having optical isotropy, for example, TAC (Triacetylcellulose) or PES (Poly Ether Sulphone).

In each of the above-mentioned embodiments, the phase difference AF module 107 or the imaging device 102 may not necessarily be provided as the light receiving sensor that receives light reflected by the half mirror 130. For example, a metering sensor (AE sensor) that detects the luminance of a subject and outputs a luminance detection signal may be provided.

The imaging device in each of the above-mentioned embodiments may not necessarily include three primary color filters for RGB but may include complementary color filters.

As the imaging device according to the above-mentioned second embodiment, it is also possible to employ an imaging device having pixels (phase difference AF pixels) that enable focus detection with respect to a subject on the basis of a phase difference detection method.

The meaning of the expression "wavelengths of peaks match each other" as used in the present invention includes not only accurately matching the wavelengths to each other but also matching one of the wavelengths close to (near) the other wavelength.

The present application contains subject matter related to that disclosed in Japanese Priority Patent Application JP 2009-298397 filed in the Japan Patent Office on Dec. 28, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
 a half mirror configured to split light from a subject having passed through a photographic optical system into transmitted light and reflected light;

a first light receiving sensor configured to receive the transmitted light, the first light receiving sensor having a spectral sensitivity characteristic with at least one sensitivity peak at a specific wavelength of light; and a second light receiving sensor that receives the reflected light, wherein the half mirror is further configured to have a spectral transmission characteristic with a transmission peak at substantially the same wavelength of the at least one sensitivity peak in the spectral sensitivity characteristic of the first light receiving sensor.

2. The imaging apparatus according to claim 1, wherein:

the first light receiving sensor is configured as an image sensor that has color filters of three colors, and can receive the transmitted light and output an image signal of the subject; and the spectral sensitivity characteristic of the first light receiving sensor has the sensitivity peak in each of respective wavelengths bands of the three colors.

3. The imaging apparatus according to claim 2, wherein the second light receiving sensor is configured as a focus detection sensor that can receive the reflected light and output a focus detection signal of the subject, and has a spectral sensitivity characteristic different from the spectral sensitivity characteristic of the first light receiving sensor.

4. The imaging apparatus according to claim 2, wherein:

the second light receiving sensor is configured as imaging image sensor, and has a spectral sensitivity characteristic obtained by shifting the spectral sensitivity characteristic of the first light receiving sensor by a predetermined amount along a direction of wavelength, wherein the spectral sensitivity characteristic of the second light receiving sensor has at least one sensitivity peak at substantially the same wavelength of a reflection peak in a spectral reflection characteristic of the half mirror.

5. The imaging apparatus according to claim 4, wherein the predetermined amount corresponds to half of a wavelength difference between adjacent ones of the sensitivity peaks in the respective wavelength bands of the three colors.

* * * * *